United States Patent [19]
Watanabe

[11] Patent Number: 5,624,004
[45] Date of Patent: Apr. 29, 1997

[54] WHEEL SUPPORT APPARATUS FOR A CARRIAGE, A CARRIAGE HAVING SAME, AND AN ARTICLE TRANSPORT SYSTEM HAVING SUCH CARRIAGES

[75] Inventor: Haruhiro Watanabe, Komaki, Japan

[73] Assignee: Daifuku Co., Ltd., Japan

[21] Appl. No.: 622,363

[22] Filed: Mar. 26, 1996

Related U.S. Application Data

[63] Continuation of Ser. No. 135,460, Oct. 12, 1993, abandoned.

[30] Foreign Application Priority Data

| Oct. 14, 1992 | [JP] | Japan | 4-071287 U |
| Mar. 16, 1993 | [JP] | Japan | 5-055303 |
| Jun. 17, 1993 | [JP] | Japan | 5-145808 |

[51] Int. Cl.⁶ ............................ B62D 6/00; B60K 7/00
[52] U.S. Cl. ........................ 180/168; 180/6.5; 180/60; 180/65.5
[58] Field of Search ................. 180/6.28, 6.5, 180/24, 24.03, 24.07, 24.08, 60, 65.5, 168, 264; 280/661

[56] References Cited

U.S. PATENT DOCUMENTS

| 2,282,749 | 5/1942 | Russell | 180/6.5 X |
| 2,284,661 | 6/1942 | Joy | 180/6.5 |
| 2,608,598 | 8/1952 | Hawkins et al. | 180/65.5 X |
| 3,280,931 | 10/1966 | Cahill et al. | 180/264 X |
| 5,088,662 | 2/1992 | Appleberry | 280/661 X |
| 5,155,683 | 10/1992 | Rahim | 180/168 X |
| 5,204,814 | 4/1993 | Noonan et al. | 180/168 X |
| 5,329,449 | 7/1994 | Tanizawa et al. | 180/168 X |
| 5,379,842 | 1/1995 | Terry | 180/264 X |

FOREIGN PATENT DOCUMENTS

| 915301 | 7/1954 | Germany | 180/65.5 |
| 542470 | 12/1957 | Italy | 180/65.5 |
| 61-113102 | 7/1986 | Japan. | |
| 61-261104 | 11/1986 | Japan. | |
| 2103879 | 8/1990 | Japan. | |

*Primary Examiner*—Brian L. Johnson
*Attorney, Agent, or Firm*—Webb Ziesenheim Bruening Logsdon Orkin & Hanson, P.C.

[57] ABSTRACT

A wheel support apparatus for a carriage, a carriage having the wheel support apparatus and an article transport system having the carriage. The wheel support apparatus comprises wheel support frames for supporting a pair of wheels and motors for driving the pair of wheels. The wheel support frames are attached to body frames through a bearing to be pivotable about a vertical axis located in an intermediate position between the pair of wheels. The bearing includes an inner race having a dimension such that part of the pair of wheels enter a space surrounded by the inner race. The wheel support frames support the wheels with part of the wheels entering the space.

12 Claims, 16 Drawing Sheets

WHEEL SUPPORT APPARATUS FOR A CARRIAGE, A CARRIAGE HAVING SAME, AND AN ARTICLE TRANSPORT SYSTEM HAVING SUCH CARRIAGES

This is a continuation of application Ser. No. 08/135,460 filed on Oct. 12, 1993 and now abandoned.

BACKGROUND OF THE INVENTION

1. Field of the Invention

The present invention relates to a wheel support apparatus for a carriage capable of not only a back-and-forth run but also complicated runs such as a spin turn, a traverse run, and an oblique run. More particularly, the invention relates to a wheel support apparatus for a carriage including a pair of wheels spaced apart in a direction of an axis of rotation, motors for driving the wheels individually, and a wheel support frame supporting the wheels and motors and connected to a body frame through a bearing to be pivotable about a vertical axis defined in a middle position between the wheels.

2. Description of the Related Art

FIG. 20 shows an example of conventional wheel support apparatus using a bearing 63 as proposed in Japanese Utility Model Publications "Kokai" No. 61-13102 and No. 2-103879, for example.

More particularly, a wheel support frame 62 supports a pair of wheels 31A and 31B spaced apart from each other in a direction of an axis of rotation and motors 33A and 33B for driving the wheels 31A and 31B, respectively. The wheel support frame 62 is pivotable about a vertical axis P located in an intermediate position between the wheels 31A and 31B. A drive wheel assembly 3' of a carriage having the wheel support frame 62 is attached to a body frame 2' by a rotary shaft frame 62a fixed to an upper portion of the wheel support frame 62 through a bearing 63 and a frame 61.

Thus, the motors 33A and 33B are rotated independently to vary a direction of the drive wheel assembly 3' about the vertical axis P.

Numeral 32 denotes axles of the wheels 31A and 31B, and numeral 62b denotes a frame suspended from the frame 62 for supporting a middle position between the axles 32. Numerals 63a and 63b denote an inner race and an outer race of the bearing 63, respectively.

According to the conventional apparatus, however, it is absolutely necessary to secure a space between upper edges of the wheels 31A and 31B and the body frame 2' for accommodating the wheel support mechanism including the rotary shaft frame 62a, the bearing 63 and the frame 61. The body frame 2' is not permitted to be lower toward the wheels than the illustrated height. As a result, a compact vehicle is not provided.

SUMMARY OF THE INVENTION

The present invention intends to solve the above-noted problems, and its primary object is to provide a more convenient and compact wheel support apparatus for a carriage, a carriage having such an apparatus, and an article transport system having such a carriage or carriages.

In order to fulfill the above object, the present invention is characterized by a wheel support apparatus for a carriage comprising wheel support frame means for supporting a pair of wheels and motors for driving the pair of wheels, the wheel support frame means being attached to body frames through a bearing to be pivotable about a vertical axis located in an intermediate position between the pair of wheels, wherein the bearing includes an inner race and has a dimension such that part of the pair of wheels enter a space surrounded by the inner race, and wherein the wheel support frame means supports the wheels with part of the wheels entering the space.

With this construction, since the pair of wheels are supported by the wheel support frame means with the upper portions of the wheels entering the inner race, it is not required to secure a space for assembling the wheel support mechanism between the upper edges of the wheels and the body frame.

As a result, a compact wheel support apparatus for a carriage is provided as compared with the conventional apparatus.

Further, the bearing used in this invention is larger than the bearing used in the prior art. This increases the supporting strength of the wheels and diminishes a rotational resistance to the wheels, as a result of which smooth rotation of the wheels is realized.

The wheel support apparatus according to the present invention may comprise wheel support frame means for supporting a pair of wheels and motors for driving the pair of wheels, the wheel support frame means being attached to body frames through a bearing to be pivotable about a vertical axis located in an intermediate position between the pair of wheels, wherein the wheel support frame means supports the wheels to be directed inwardly with respect to a running direction of the carriage, respectively.

With this construction, since the wheels are supported to be directed inwardly with respect to the running direction of the carriage, respectively, the carriage travels with the wheels exerting an inwardly directed force on the carriage, respectively.

For example, the wheels of the carriage running straight may rotate as shown in FIG. 11 due to any external factor such as an uneven surface of the ground (the wheels are rotated with the direction of the right wheel 31B being conformed with the running direction of the carriage to make the explanation simple).

In this case, an inertial force is applied to the carriage in the running direction before the wheels are rotated, i.e. the direction shown by an arrow in FIG. 11. This inertial force applied to the carriage acts on the pair of wheels 31A and 31B, respectively. That is, a force is produced to move the wheels 31A and 31B in the direction as shown by the arrow.

The force produced by the inertial force is exerted on the right wheel 31B in the same direction as the direction of rotation of the wheel 31B, while being exerted on the left wheel 31A in a different direction from the direction of rotation of the wheel 31A. Consequently, a frictional resistance of the wheel 31B with respect to the ground is reduced as compared with a frictional resistance before the wheel is rotated, while a frictional resistance of the wheel 31A increases as compared with a frictional resistance before the wheel is rotated.

Therefore, if the wheels of the carriage running straight rotate due to the external factor such as the uneven surface of the ground, the frictional resistance of one of the wheels rotating in the same direction (the right wheel 31B) decreases, while the frictional resistance of the other wheel (the left wheel 31A) increases. Thus, a force is applied to the wheels in a direction to restore rotation of the wheels (a restoring force).

As a result, rotation of the wheels is corrected automatically to increase the stability of the carriage running straight and eliminate instability of the carriage due to the external factor such as the uneven surface of the ground.

If the pair of wheels were mounted parallel to the running direction of the carriage, both of the wheels would establish the same relationship between the direction of rotation of the wheels and the direction to apply the inertia force when the wheels are rotated in the same manner as in FIG. 11. Thus, the same frictional resistances would act on the right and left wheels after rotation, wherefore, the restoring force as noted above is not produced. In this condition, the carriage continues to travel with the wheels being rotated, which changes the running direction thereby to cause instability of the carriage.

FIG. 11 is a plan view showing a positional relationship between the direction of the pair of wheels and the running direction of the carriage when the wheels are rotated rightward, in which a reference sign P denotes a vertical axis about which the wheels 31A and 31B are swivelable.

As shown in FIG. 12, the carriage is inclined when making a turn.

More particularly, FIG. 12 is a rear view showing the carriage turning rightward, in which a centrifugal force is applied to the carriage in a direction as shown by an arrow (a direction opposite to the turning direction). Thus, an amount of deformation of an outer skin (rubber) of the outer wheel 31A is increased as compared with an outer skin (rubber) of the inner wheel 31B at contact portions between the wheels and the ground. As a result, the carriage is inclined as shown in FIG. 12.

In the same manner, the upper portions of the wheels are inclined in the direction opposite to the turning direction (the leftward direction), as a result of which a force is applied to drive the wheels in a direction opposite to the turning direction (the leftward direction).

However, since the left wheel 31A is directed inwardly (rightward) of the running direction of the wheels, the force to run the wheel 31A leftward is reduced.

On the other hand, since the right wheel 31B is directed leftward, the force to run the wheel 31B leftward is increased. Since the number of rotations of the wheel 31B is smaller than that of the wheel 31A while the carriage makes the turn, the force applied to the wheel 31B to run the wheel leftward is less than the force applied to the wheel 31A.

The pair of wheels are directed inwardly with respect to the running direction of the wheels to increase the running stability of the carriage making a turn and thus to increase a turning speed of the carriage.

As noted above, the outer skins of the wheels are made of a resilient material such as rubber. However, resilient surfaces of the ground would produce the same effects even if the outer skins of the wheels are not made of the resilient material.

With the above-noted structure, instability of the carriage running straight is eliminated while stability of the carriage while making a turn is enhanced. As a result, the running efficiency of the carriage is improved, and the running speed of the carriage is increased to promote operative efficiency.

Further, the wheel support apparatus according to the present invention may comprise a pivot frame pivotable about a vertical axis with respect to body frames for supporting a pair of wheels spaced apart from each other in a direction of an axis of rotation and driven in forward and backward directions independently, with the vertical axis being located in an intermediate position between the wheels, and wheel support frame means for supporting the wheels, the frame means being pivotably supported by the pivot frame to be vertically oscillatable about a horizontal axis substantially perpendicular to the axis of rotation in plan view.

With such a structure, since the wheel support frame means supporting the wheels is supported by the pivot frame to be vertically oscillatable about the horizontal axis, the pair of wheels are vertically oscillated about the horizontal axis when running on an uneven ground, to be maintained in a condition to constantly contact the ground.

Still further, the wheel support apparatus of the present invention may comprise a pivot frame pivotable about a vertical axis with respect to body frames for supporting a pair of wheels spaced apart from each other in a direction of an axis of rotation and driven in forward and backward directions independently, with the vertical axis being located in an intermediate position between the wheels, and support means for resiliently supporting the wheels to be vertically movable with respect to the pivot frame, respectively.

In this construction, since the wheels are resiliently supported to be vertically movable, respectively, the wheels are vertically moved when running on an uneven ground, to be maintained in a condition to contact the ground.

As a result, the pair of wheels are constantly maintained in a condition to contact the uneven ground to provide a wheel support apparatus for a carriage for conducting proper steering control.

DETAILED DESCRIPTION OF THE PREFERRED EMBODIMENTS

An embodiment of a wheel support apparatus for a carriage according to the present invention will be described in detail hereinafter with reference to the accompanying drawings.

Figure 4:
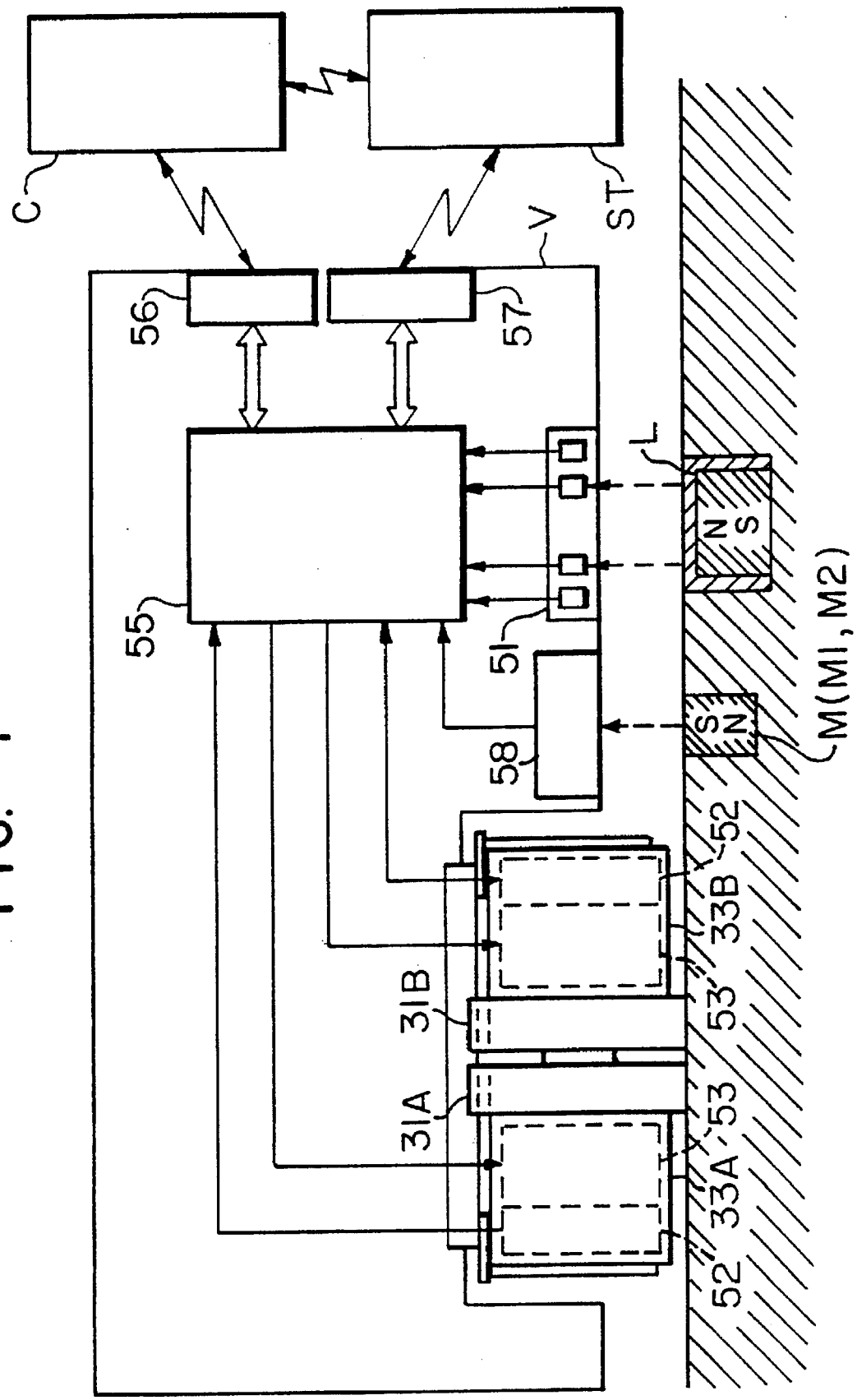
FIG. 4 is a block diagram showing a construction of the apparatus shown in FIG. 1.
Figure 5:
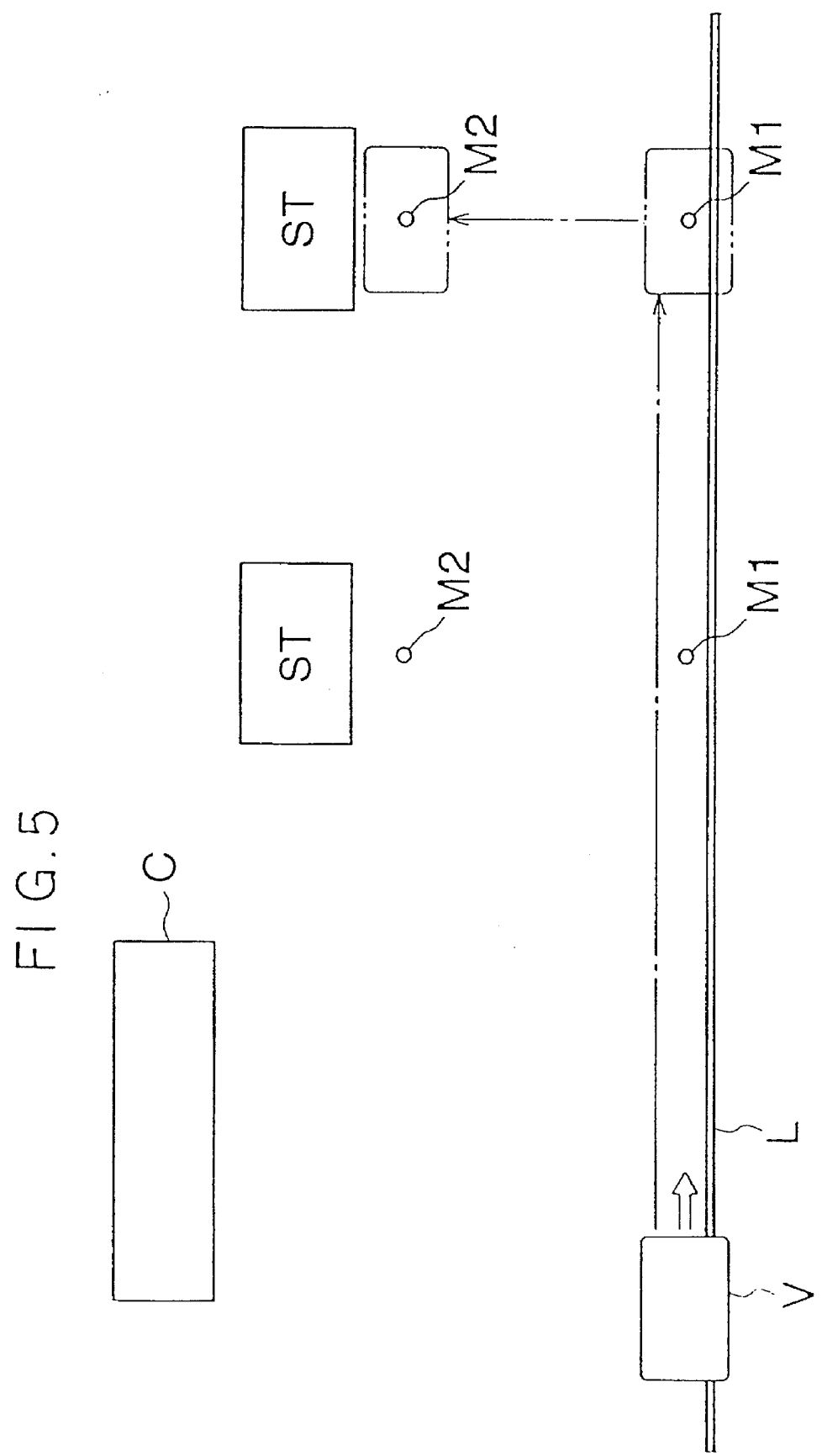
FIG. 5 illustrates a running procedure of the carriage shown in FIG. 1.

FIGS. 4 and 5 illustrate a running control system having a wheel support apparatus in a first embodiment of the invention. This system includes a carriage or carriages V running between a plurality of stations ST along a guide track L for delivering and receiving articles, and a ground control unit C for instructing the carriage V to run. An article transport demand from the stations ST to the ground control unit C, and a running demand from the control unit C to the standing carriage V are transmitted through communication units 56 mounted on the stations ST, the control unit C and the carriage V, respectively.

The carriage V includes a magnetic sensor 51 for detecting the guide track L, encoders 52 acting as a running distance detecting device for detecting a distance covered by the carriage V, a control device 55 for controlling the running of the carriage V, the communication unit 56 for making radio communications with the control unit C, an optical communication unit 57 for communicating with each of the stations ST on placement of the articles when the articles are delivered to or received from the station ST, and a stop mark detecting device 58 for detecting stop marks M.

Communication units 56 mounted on the stations ST and the control unit C are not shown in the drawings.

The structure of the carriage V will be set forth next.

Figure 1:
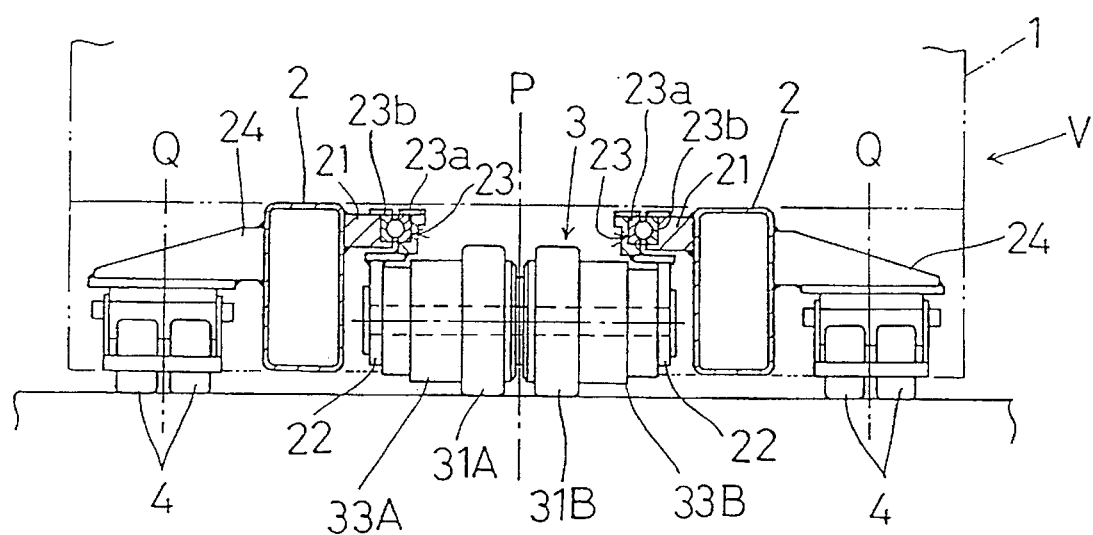
FIG. 1 is a front view of a wheel support apparatus for a carriage.
Figure 2:
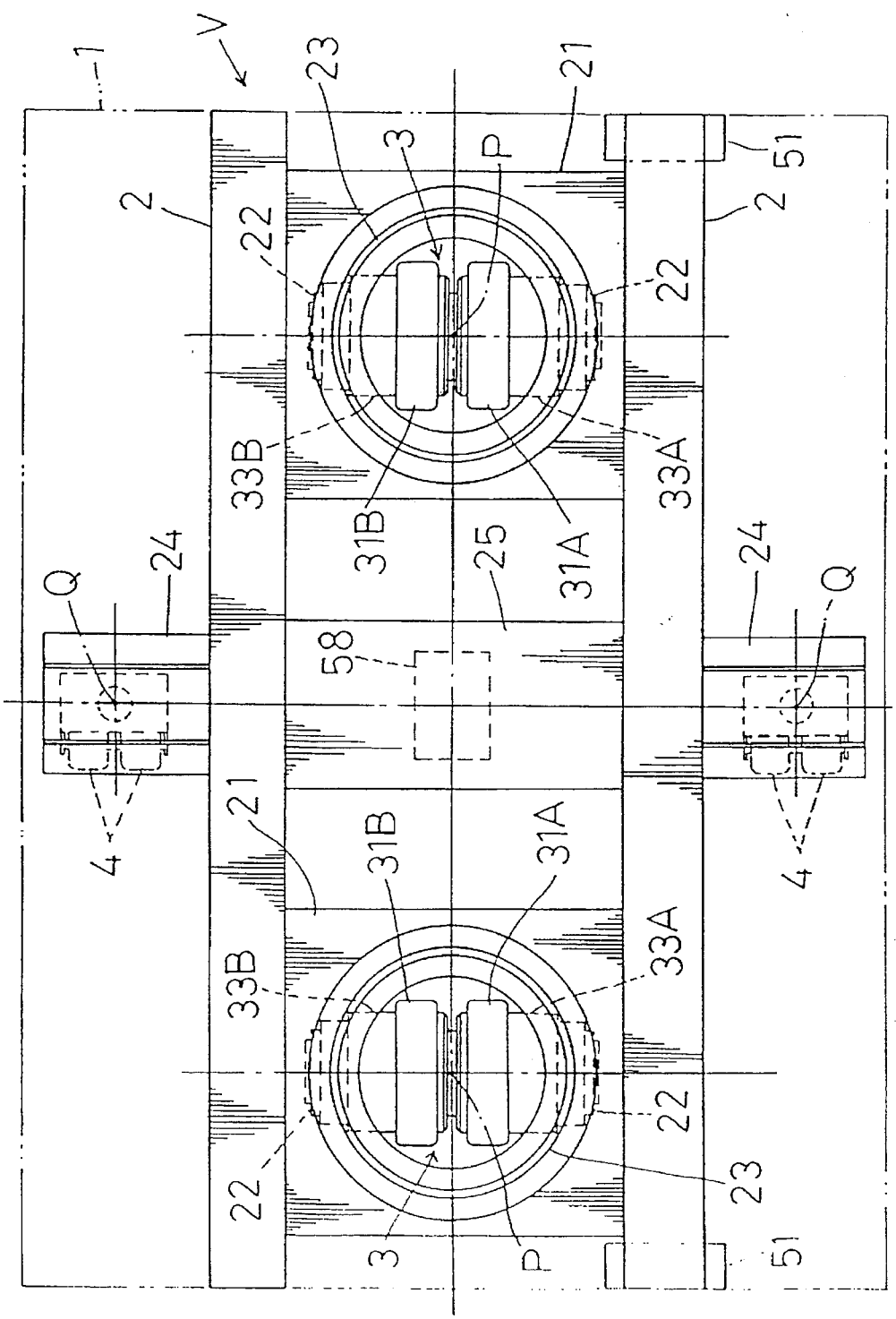
FIG. 2 is a plan view of the apparatus shown in FIG. 1.
Figure 3:
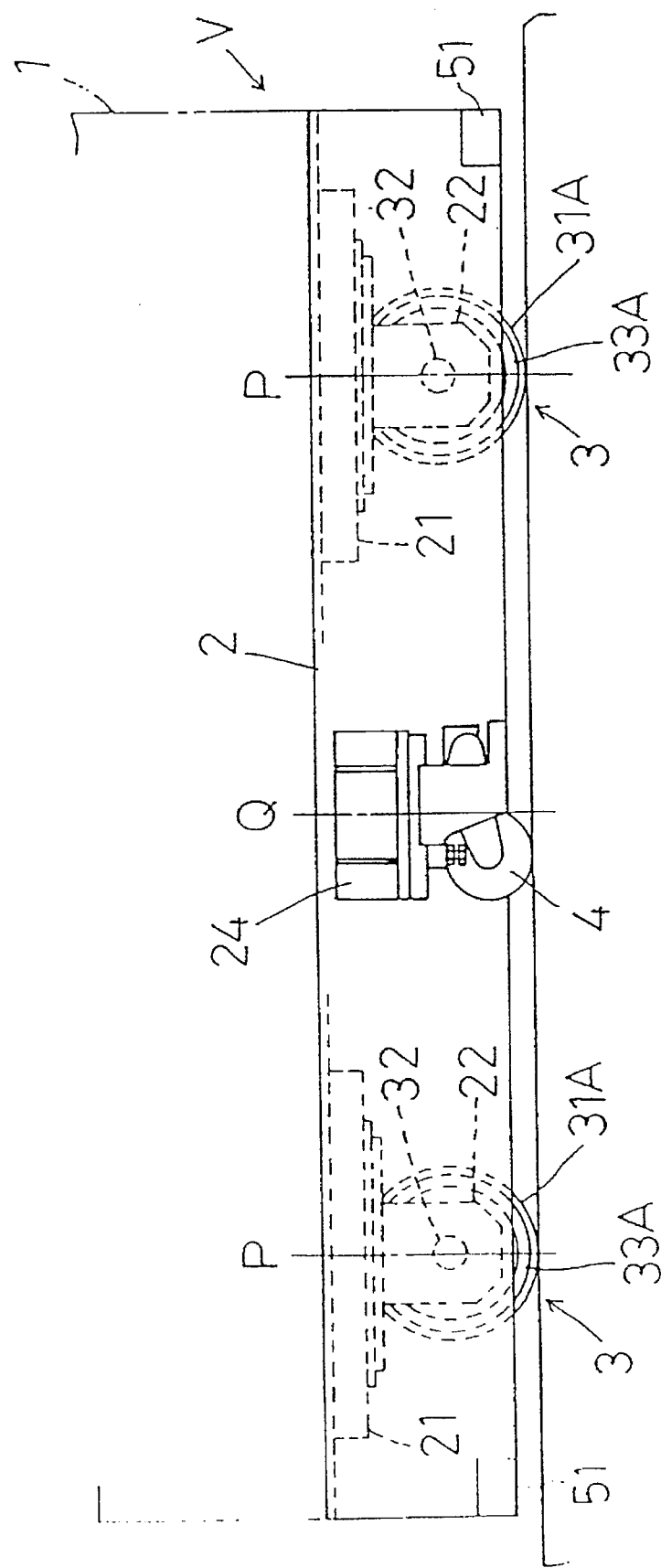
FIG. 3 is a side view of the apparatus shown in FIG. 1.

FIGS. 1 through 3 show that the carriage V comprises an article handling section 1, body frames 2 for supporting the article handling section 1, and two drive wheel assemblies 3 arranged longitudinally of the body frames 2. Each of the drive wheel assemblies 3 is connected to the body frames 2 through a bearing 23 and a first frame 21 such that wheel support frames 22 supporting a pair of wheels 31A and 31B spaced apart from each other in a direction of an axis of rotation and motors 33A and 33B for driving the wheels 31A and 31B individually are pivotable about a vertical axis P defined in a middle position between the pair of wheels 31A and 31B. Numeral 32 denotes axles of the drive wheels 3.

The bearing 23 is formed of an inner race 23a and an outer race 23b, and has a dimension such that upper portions of the pair of wheels 31A and 31B enter an inner space surrounded by the inner race 23a. The wheel support frames 22 are fixed to the inner race 23a to support the wheels 31A and 31B with the upper portion of the wheels 31A and 31B entering the space surrounded by the inner race 23a of the bearing 23. The first frame 21 is fixed to the outer race 23b.

The carriage V further comprises a right and left pair of follower wheel assemblies 4 each connected to a substantially mid position of one of the body frames 2 through a second frame 24 to be pivotable about a vertical axis P.

Thus, in order to run the carriage V straight, the control device 55 of the carriage V rotates the motors 33A and 33B in the same direction at the same speed based on information from the encoders 52. In order to change a running direction of the carriage V, the control device 55 stops the carriage V once and rotates motors 33A and 33B in opposite directions, thereby freely varying the running direction of the drive wheels 3.

The motors 33A and 33B have these encoders 52 and motor drive circuits 53 as built-in components thereof. The encoders 52 detect the number of rotations of the motors 33A and 33B, respectively.

The stop mark detecting device 58 is attached to the body frames 2 through a third frame 25 to be centered on the carriage V.

FIG. 4 shows that the guide track L includes a magnetic element laid under a track surface and having a rectangular section with an upper portion acting as N-pole and a lower portion acting as S-pole. Epoxy resin is settled around the magnetic element to be flush with the track surface to fix the magnetic element in place. Stop marks M are magnet pieces laid under the track surface with an upper portion acting as S-pole and a lower portion acting as N-pole. As shown in FIG. 5, the stop marks M include marks M1 each indicating a stop position on the guide track L and marks 2 each indicating a stop position adjacent a station ST.

Referring to FIG. 4, the magnetic sensor 51 includes four magnetic sensing elements arranged at predetermined intervals transversely of the carriage. The two inner elements of the four magnetic sensing elements sense magnetism from the guide track L when the carriage V is transversely in a proper position with respect to the guide track L, i.e. with a transverse center of the magnetic sensor 51 in a mid position of the guide track L. In this state, the two outer elements do not sense the magnetism from the guide track L.

As seen from FIG. 2, two such magnetic sensors 51 are provided on bottom portions of the right body frame 2, one forwardly and the other rearwardly of the carriage V.

When the forward magnetic sensor 51 is displaced sideways with respect to the guide track L, either one of the two outer magnetic sensing elements senses magnetism from the guide track L. The control device 55 effects a steering control of the motors 33A and 33B for the front drive wheel 3 in response to a detected result of the sensor to restore the forward magnetic sensor 51 to a proper position with respect to the guide track L.

In a similar manner, the control device 55 controls the motors 33A and 33B of the rear drive wheel assembly 3 in response to a detected result from the rearward magnetic sensor 51.

The control device 55 controls the motor drive circuits 53 in response to a detection information from the encoders 52 in the steering control of the motors 33A and 33B of the drive wheel assemblies 3.

A running control of the carriage V will be described next referring to FIG. 5. If the control unit C instructs the carriage V to travel to the second station ST, for example, the control device 55 of the carriage V drives the front and rear drive wheel assemblies 3 to staff to run along the guide track L. The stop mark detecting device 58 detects the second stop mark M1 to stop the carriage V. Then, after the directions of the front and rear wheel assemblies 3 are changed to a transverse direction of the carriage V at that position, the carriage V is moved transversely toward the target station ST and stops when the stop mark detecting device 58 detects the stop mark M2.

The present invention may be modified as follows:

(1) The carriage V of the foregoing embodiment comprises a pair of drive wheel assemblies 3 arranged in the longitudinal direction. However, only one drive wheel assembly or more than two drive wheel assemblies may be provided instead.

(2) According to the foregoing embodiment, each bearing 23 has such a dimension that the upper portions of the pair of wheels 31A and 31B enter the space surrounded by the inner races 23a, and the wheel support frames 22 support the wheels 31A and 31B with the upper portions of the wheels 31A and 31B entering the space in the inner race 23a. Alternatively, the wheels 31A and 31B may be supported with middle portions or lower portions thereof lying in the space surrounded by the inner races 23a.

A further embodiment will be set forth below.

Figure 10:
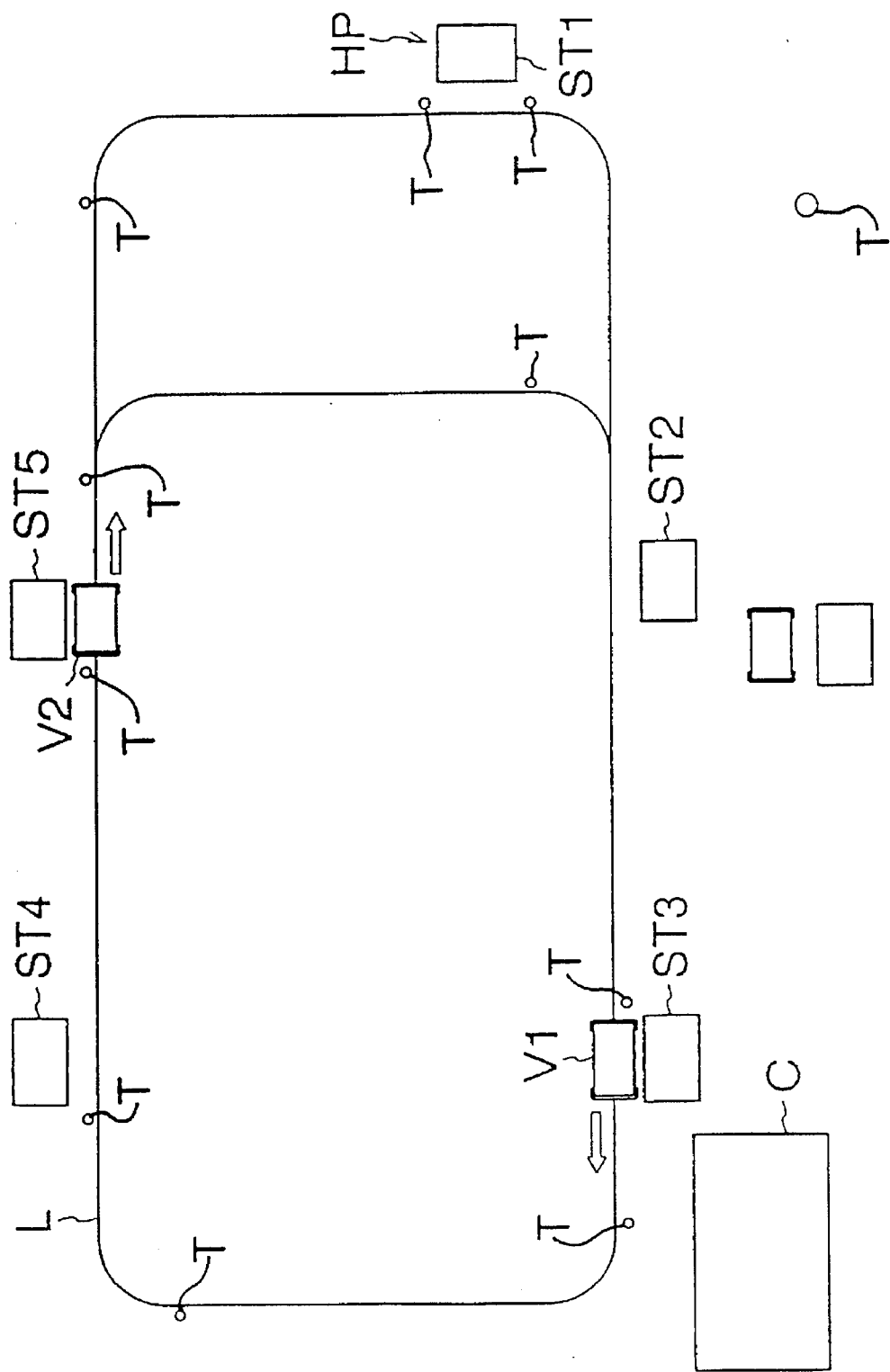
FIG. 10 illustrates a running procedure of the carriage shown in FIG. 6.
Figure 11:
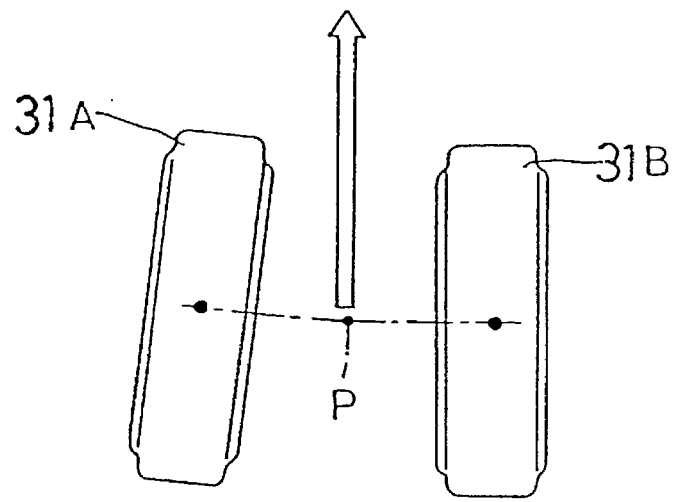
FIG. 11 illustrates a running condition of wheels of the carriage shown in FIG. 6.
Figure 12:
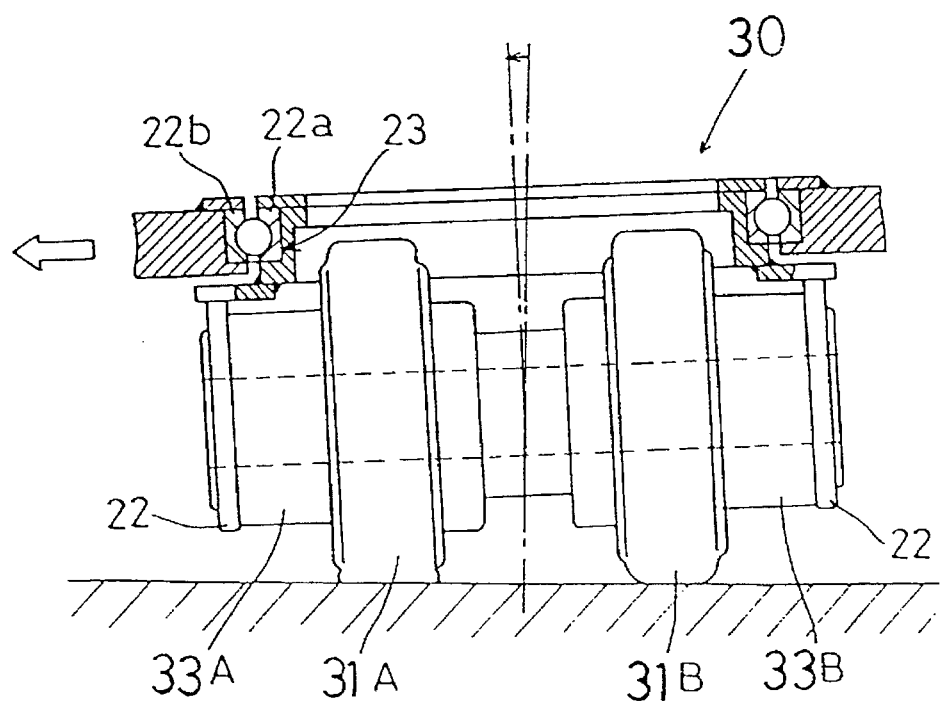
FIG. 12 illustrates a running condition of wheels of the carriage shown in FIG. 6.

According to a transport system as shown in FIG. 10, looped guide tracks L are provided as predetermined running lines for article transport carriages V. A plurality of stations ST (ST1 to ST5) are arranged along the guide tracks L where carriages V (V1, V2) stop to deliver or receive articles. In this system, the plurality of carriages are automatically driven to transport the articles between the stations ST. FIG. 10 schematically illustrates a layout of the actual transport system, and represents one example of the system in which each carriage V is loaded with articles at any one of the stations ST in response to a working command supplied from the control unit C and unloaded at a different one of the stations ST.

The station ST1 is a home position HP for battery charging and maintenance and inspection of the carriages V.

Figure 9:
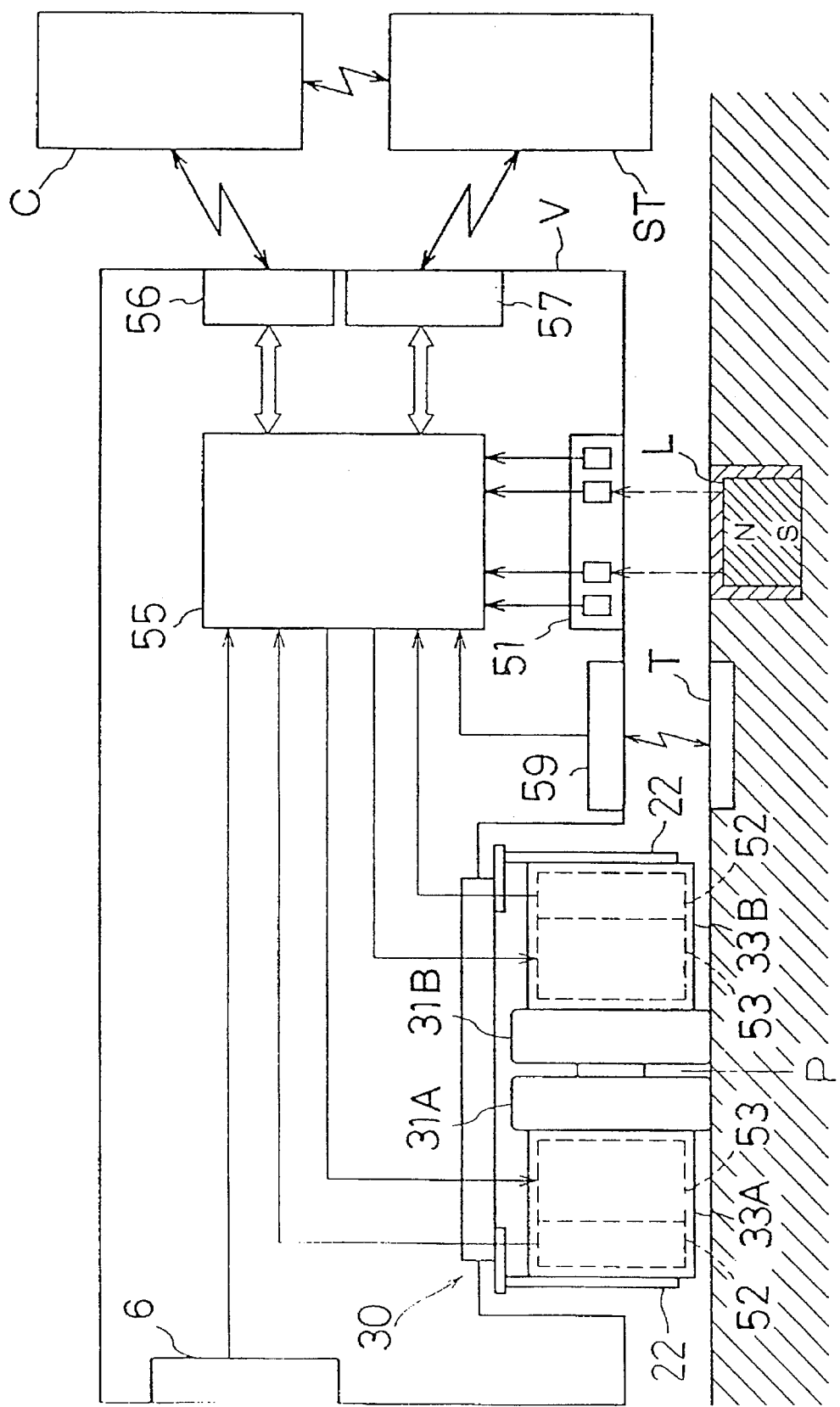
FIG. 9 is a block diagram showing a running control apparatus of the carriage shown in FIG. 6.

Referring to FIG. 9, each guide track L includes a magnetic element laid under a track surface and having a rectangular section with an upper portion thereof acting as N-pole and a lower portion thereof acting as S-pole. Epoxy resin is settled around the magnetic element to be flush with the track surface to fix the magnetic element in place. As seen from FIG. 10, storage media T referred to as ID tags are laid underground at curved portions, branch portions, joined portions of the guide tracks L, and before the stations ST, respectively. Each storage medium T stores running control information required for running the carriages V at the point of its installation. More particularly, such information includes a running speed at a curved portion, an address of each station, a distance to a stop point, an address of a branching guide track L, and the like.

The structure of the carriage V according to the second embodiment will be described hereinafter.

Figure 8:
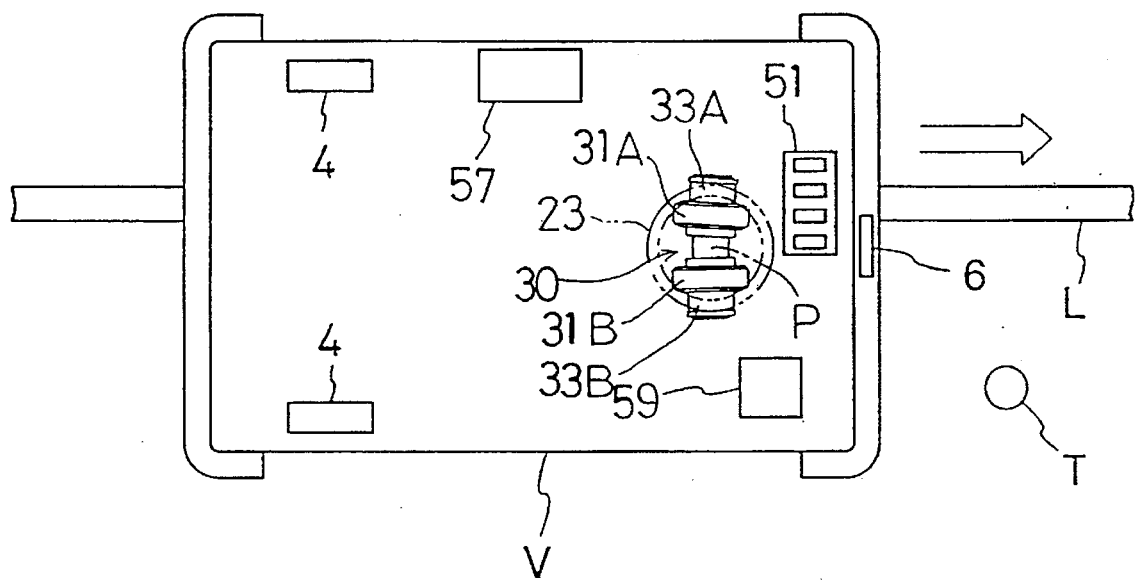
FIG. 8 is a sectional plan view of a general construction of the carriage as shown in FIG. 6.

Referring to FIG. 8, the carriage V comprises a drive wheel assembly 30 mounted forwardly thereof, and a pair of freely rotatable follower wheels 4 mounted rearwardly thereof. A magnetic follower sensor 51 is provided for detecting the guide tracks L and obtain information for steering control. The sensor 51 is movable with the drive wheels 30 to change directions.

Forwardly of the right side of the carriage is provided a tag reader 59 for reading the information stored in the storage media T laid under the track surfaces.

An optical communication unit 57 is mounted on an intermediate portion of the left side of the carriage for transmitting or receiving information to/from the stations ST when handling articles at the stations ST.

An ultrasonic sensor 6 is provided in a front face of the carriage for detecting any obstacles lying ahead of the carriage V in a running direction.

Figure 6:
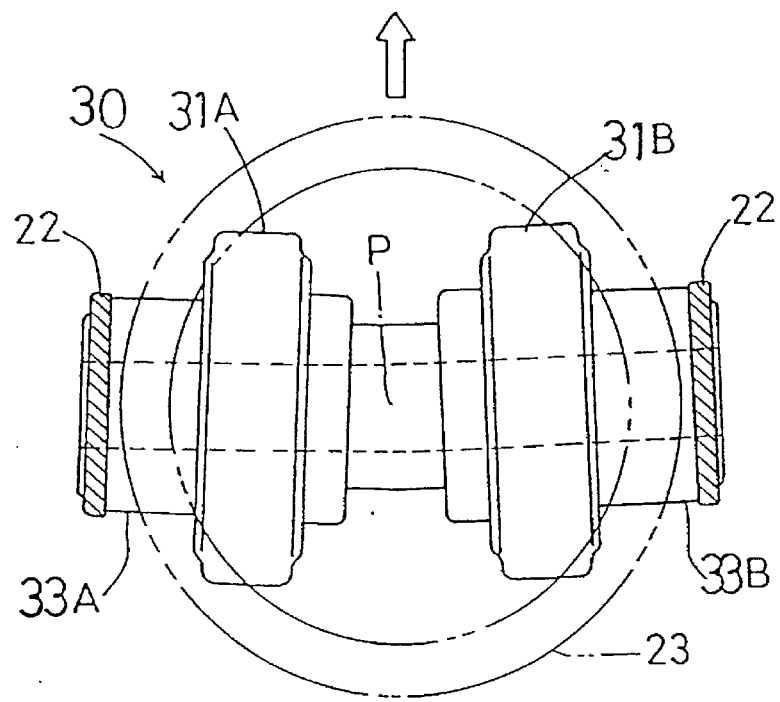
FIG. 6 is a plan view of a wheel support apparatus for a carriage according to a further embodiment.
Figure 7:
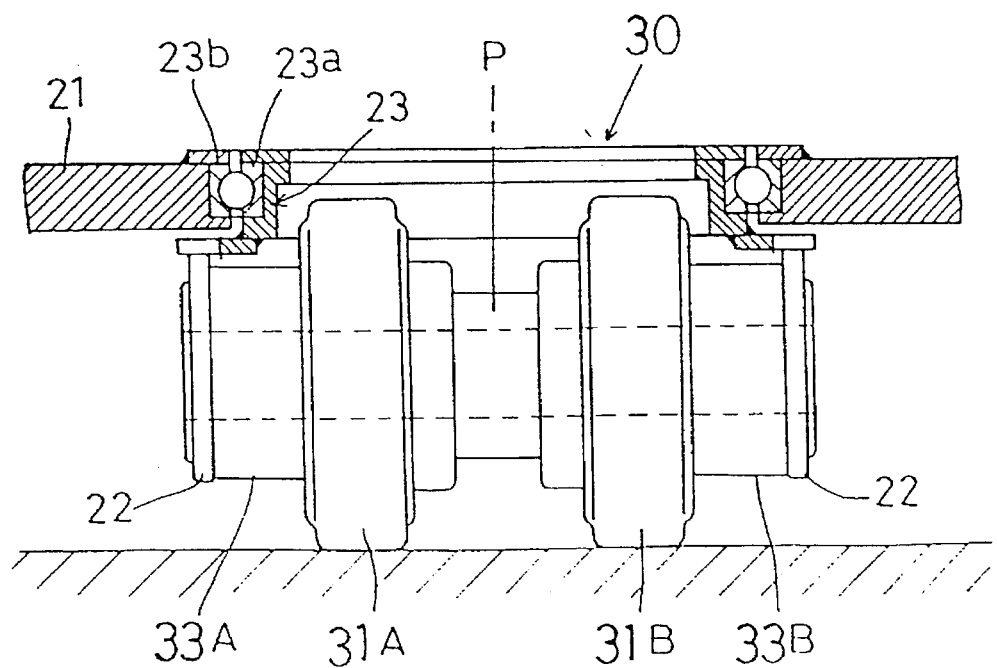
FIG. 7 is a front view of the wheel support apparatus shown in FIG. 6.

Referring to FIGS. 6 and 7, the drive wheel assembly 30 is attached to a body frame 21 through a bearing 23 such that wheel support frames 22 supporting a pair of wheels 31A and 31B spaced apart in a direction of an axis of rotation and motors 33A and 33B for driving the wheels 31A and 31B individually are pivotable about a vertical axis P defined in a mid position between the wheels 31A and 31B.

The wheel support frames 22 support the pair of wheels 31A and 31B, respectively, to be toed in or directed inwardly with respect to a running direction of the wheels.

The bearing 23 includes an inner race 23a and an outer race 23b. The inner race 23a has such a dimension that upper portions of the wheels 31A and 31B enter an inner space defined thereby. As shown in FIGS. 6 and 7, the bearing 23 overlaps at least part of the motors 33A and 33B in plan view such that a cylinder defined by the bearing 23 and which is parallel to the vertical axis P encircles at least part of the motors 33A and 33B. The wheel support frames 22 are secured to the inner race 23a to support the wheels 31A and 31B with the upper portions of the wheels 31A and 31B entering the space. The body frame 21 is fixed to the outer race 23b and attached to the respective motor 33A or 33B at a position radially outward of the inner race 23a in plan view and further at a position on the motor 33A or 33B which is generally opposite from where the wheel 31A or 31B is positioned relative to the motor 33A or 33B, respectively.

The pair of wheels 31A and 31B and the freely rotatable follower wheels 4 have outer skins made of rubber to absorb vibrations caused by the carriage running on uneven surfaces.

As shown in FIG. 9, the motors 33A and 33B house rotary encoders 52 for detecting the number of rotations of the motors and motor drive circuits 53.

The carriage V includes a microcomputerized control device 55 for controlling the carriage in response to information received from the magnetic sensor 51, the tag reader 59, the optical communication unit 57, the ultrasonic sensor 6, the radio communication unit 56, and the rotary encoders 52.

Thus, drive, stop and speed controls of the motors 33A and 33b are effected through the propelling motor drive circuits 53, as a result of which, start, stop, turn, and speed controls of the carriage V are effected to steer the carriage V along the guide tracks L. More particularly, in order to propel the carriage V straight, the control device 55 of the carriage V rotates the motors 33A and 33B in the same direction at the same speed, while in order to turn the carriage V, the motors 33A and 33B are rotated at different speeds to allow a turning angle to be varied as desired.

The ground control unit C, the stations ST and the carriages V include the radio communication units 56, respectively, to allow communication between the control unit C and each station ST, or between the control unit C and each carriage V.

Each station ST transmits an article delivery demand to the control unit C. Each carriage V transmits information on its standby station and start or finish of handling of the articles to the control unit C. The control unit C transmits a running instruction to the carriage V in response to the information on the standby station of the carriage and the article delivery demand from the station ST.

An optical communication unit 57 mounted on each station and radio communication units 56 mounted on the stations and the control unit C are not shown in the drawings.

Referring to FIGS. 8 and 9 again, the follower sensor 51 includes four magnetic sensing elements arranged in a transverse direction of the carriage. The two inner elements of the four magnetic sensing elements work to sense magnetism from the guide track L but the outer two do not when the carriage V is in a proper position transversely with respect to the guide track L, i.e. with a transverse center of the follower sensor 51 being in the center of the guide track L. Therefore, if the carriage V is displaced transversely with respect to the guide track L, either of the two outer magnetic sensing elements senses the magnetism of the guide track L. As a result, the control device 55 effects steering control for restoring the carriage to the proper position with respect to the guide track L in response to the detection information.

The tag reader 59 conducts close-range radio communication by electromagnetic induction with the storage media T to read the information stored in the storage media T and transmit such information to the control device 55. The storage media T contain a reloadable semiconductor memory (EEPROM), a loop antenna, a signal processing circuit and a control circuit for conducting close radio communication through electromagnetic induction with external devices. With this construction, the running control information as noted above is written into or read from the storage media T without contacting the media.

During a run of the carriage V, the tag reader 59 transmits a signal for demanding a response to unspecified storage media T at predetermined intervals of time. On the other hand, the storage media T are maintained in a condition for receiving the signal for demanding a response from the tag reader 59. Therefore, when the carriage V approaches the location of one of the storage media T such that the tag reader 59 and this storage medium T become close enough to each other for communication, the storage medium T receives the signal from the tag reader 59 and makes a response. When the communication between the storage medium T and the tag reader 59 becomes possible, the information stored in the storage medium T is read by the tag reader 59.

Thus, as the carriage V moves close to the storage media T provided along the guide track L, the stored information is read by the tag reader 59 and is provided to the control device 55 conducting the running control. The control device 55 controls stoppage or branching of the carriage based on the information provided.

An unillustrated mark is provided for the stop position of the carriage V at each station ST. The mark is made of a magnet plate and detected by a mark sensor (magnetic sensor) provided on the carriage V.

The present invention may be modified as follows:

1) The carriage according to the foregoing embodiment includes only one drive wheel assembly 30, but may include a plurality of drive wheel assemblies.

2) In the foregoing embodiment, the pair of wheels 31A and 31B is directed inwardly with respect to the running direction of the carriage V. Besides, the wheels 31A and 31B may be provided such that upper portions thereof are directed outwardly. This construction is known as a camber structure which further facilitates steering of the wheels.

3) In the foregoing embodiment, the looped guide tracks L are laid as predetermined running lines, along which the carriages V move. However, the guide tracks L are dispensable and the carriages V may effect a self-controlled run based on built-in map information contained in the carriages V. In this case, the running of the carriages V may be controlled in the same manner as in the foregoing embodiment as well.

A still further embodiment will be set forth below.

Figure 18:
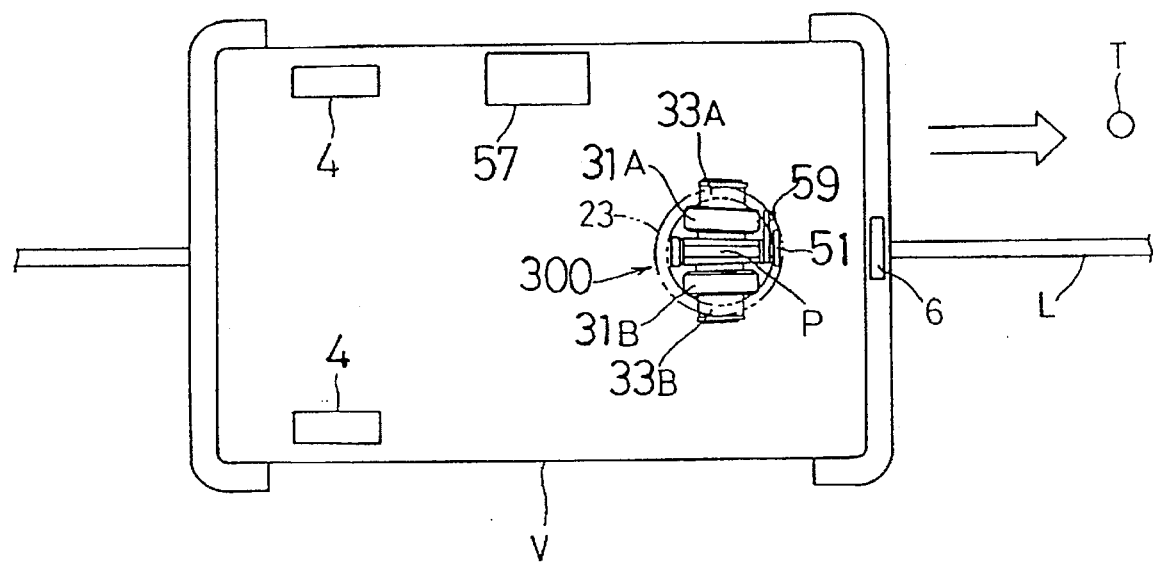
FIG. 18 is a sectional plan view showing a general construction of the carriage shown in FIG. 13.

Referring to FIG. 18, a carriage V include a drive wheel assembly 300 provided in a forward position of a vehicle body, and a right and left pair of follower wheels 4 provided rearwardly of the vehicle body. A follower sensor 51 is provided for detecting a guide track L and obtaining information for steering control.

The sensor 51 is movable with the drive wheel 300 to change directions.

The carriage V further includes a tag reader 59 for reading information stored in storage media T laid under track surfaces. The reader 59 is also movable with the drive wheel 300 to change its directions.

An optical communication unit 57 is mounted on a middle portion of a lateral left side face of the vehicle body for exchanging information with the stations when the carriage handles the articles.

On a front face of the vehicle body is mounted an ultrasonic sensor 6 for detecting presence of obstacles ahead of the carriage V.

Figure 13:
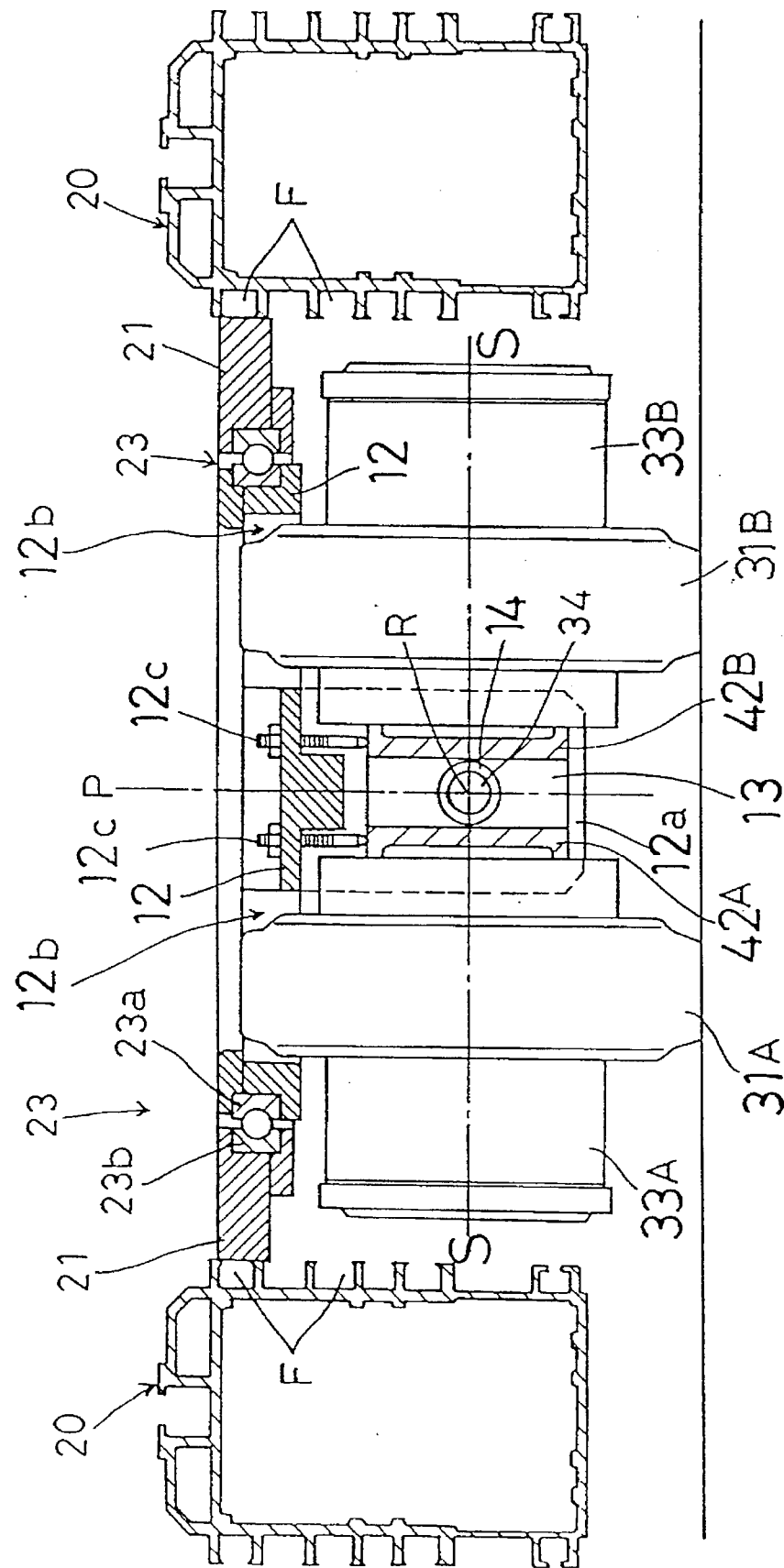
FIG. 13 is a sectional front view of a wheel support apparatus for a carriage according to a still further embodiment.
Figure 14:
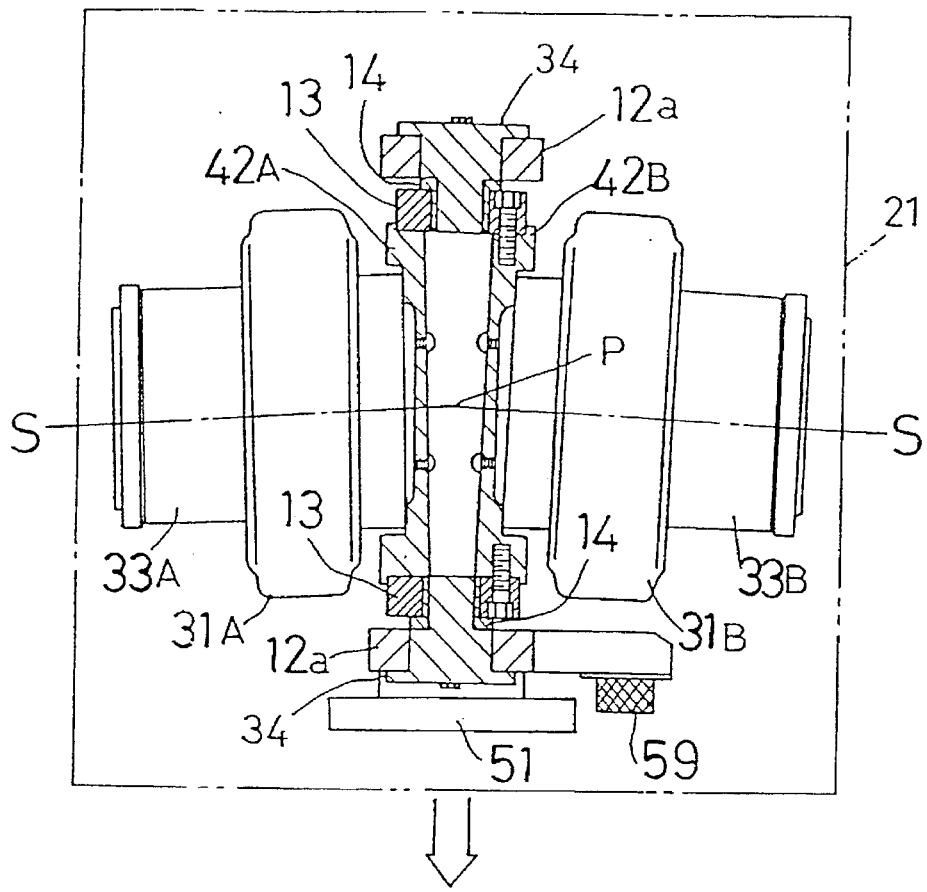
FIG. 14 is a sectional plan view of the wheel support apparatus shown in FIG. 13.
Figure 15:
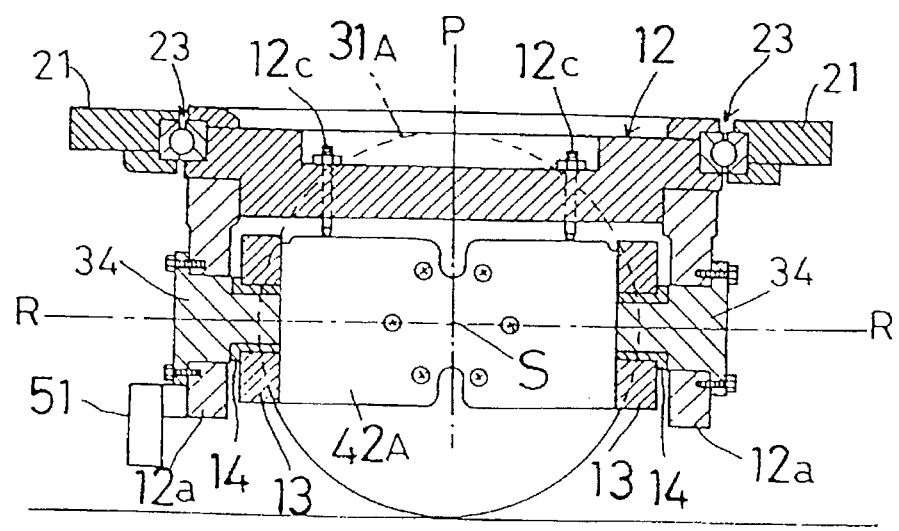
FIG. 15 is a sectional side view of the wheel support apparatus shown in FIG. 13.
Figure 16:
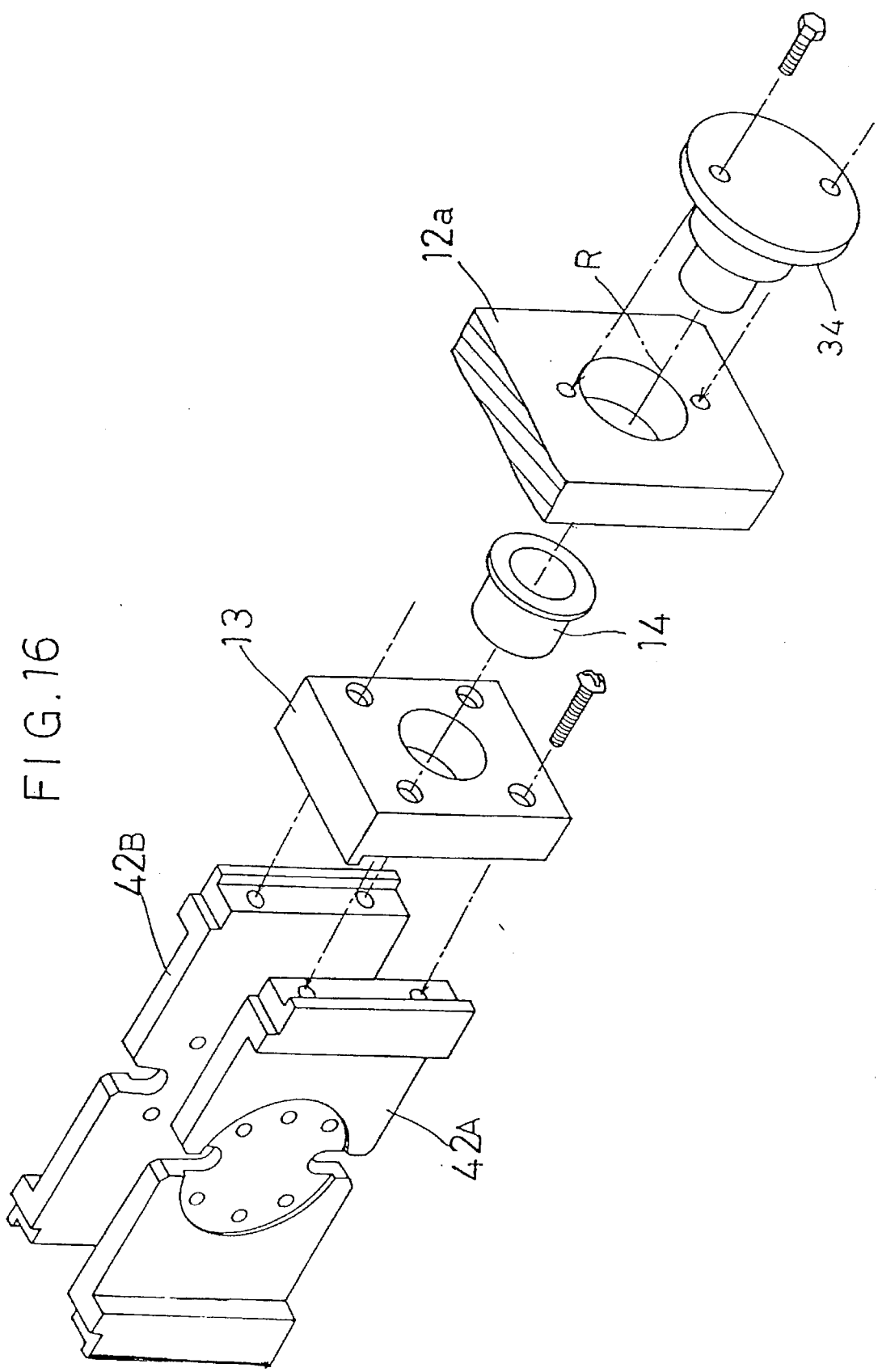
FIG. 16 is an exploded perspective view showing wheel support frames and a pivot frame of the carriage shown in FIG. 13.

As shown in FIGS. 13 through 15, the drive wheel assembly 300 includes a pair of wheels 31A and 31B driven in forward and backward directions by motors 33A and 33B, respectively. The wheels 31A and 31B are spaced from each other in a direction of an axis of rotation S and supported by a pivot frame 12 with a vertical axis P being defined in the center between the wheels. The pivot frame 12 is supported by a first frame 21 to be pivotable about the vertical axis P. More particularly, the pivot frame 12 is fixed to an inner race 23a of a bearing 23 to be pivotable about the vertical axis P. The bearing 23 also includes an outer race 23b fixed to the first frame 21.

The bearing 23 has such a dimension that upper portions of the pair of wheels 31A and 31B enter a space surrounded by the inner race 23a. The pivot frame 12 supports the wheels 31A and 31B with the upper portions of the wheels 31A and 31B entering the space surrounded by the inner race 23a of the bearing 23.

A mechanism for supporting the pair of wheels 31A and 31B by the pivot frame 12 will be described in detail below referring to FIGS. 13 through 16.

In reference to FIG. 14, wheel support frames 42A and 42B are spaced apart from each other and interconnected through a pair of frames 13 to support the wheels 31A and 31B directed inwardly with respect to the running direction of the wheels.

The pair of frames 13 are attached to support pieces 12a of the pivot frame 12 to be pivotable about a horizontal axis R through collars 14 and support shafts 34.

Thus, the wheel support frames 42A and 42B supporting the pair of wheels 31A and 31B are pivotably supported by the pivot frame 12 to be vertically oscillatable about the horizontal axis R substantially perpendicular to the axis of rotation S in plan view.

Figure 17:
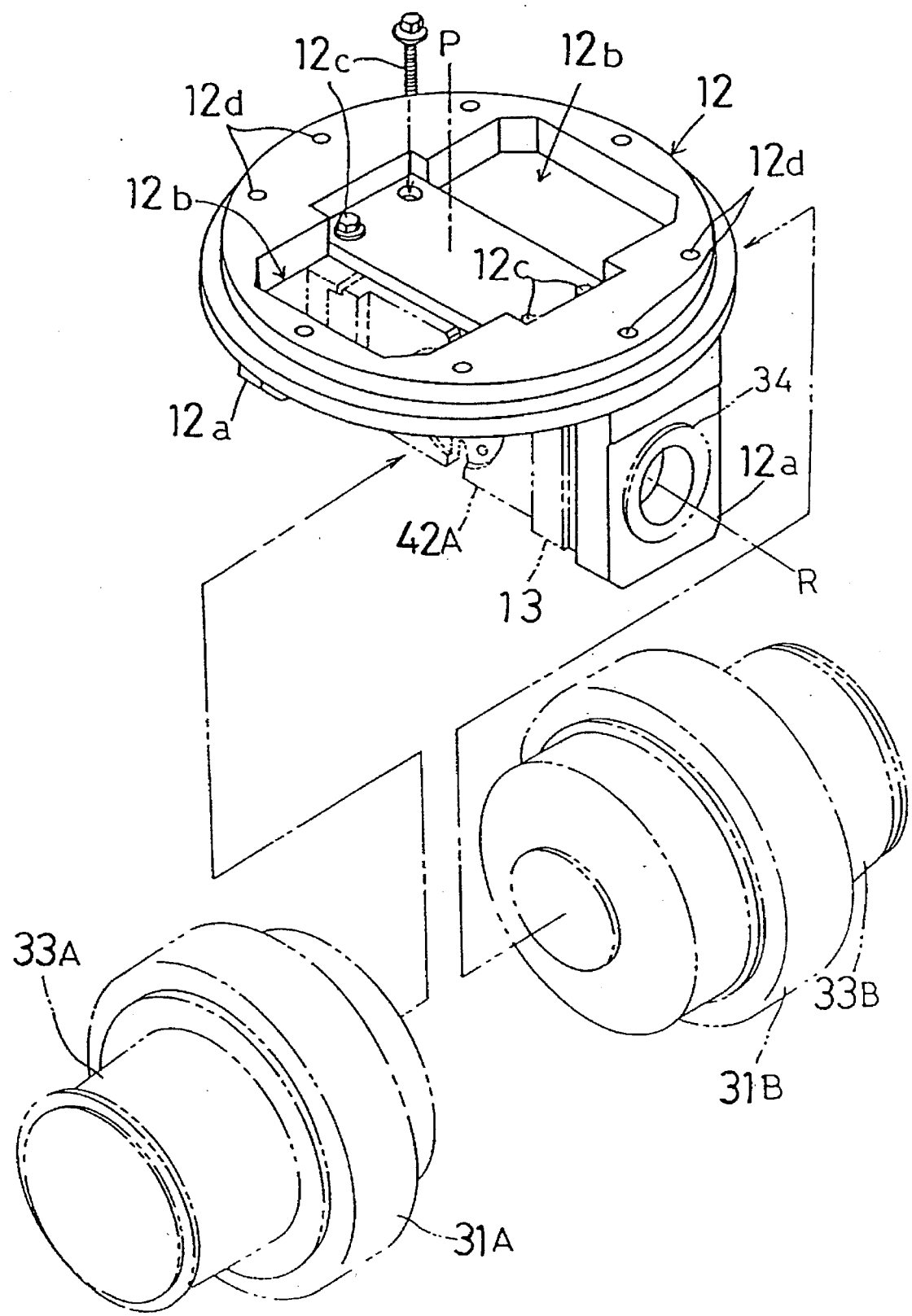
FIG. 17 is a perspective view of the pivot frame of the carriage shown in FIG. 13.

Referring to FIG. 17, the pivotable frame 12 includes openings 12b for receiving the upper portions of the pair of wheels 31A and 31B extending into the space defined by the inner race 23a of the bearing 23, and stoppers 12c for restricting an amount of pivotal movement of the wheel support frames 42A and 42B.

Numeral 12d denotes mounting bores for attaching a mounting element for securing the pivot frame 12 to the inner race 23a.

As shown in FIGS. 14 and 15, the follower sensor 51 and the tag reader 59 are attached to distal end portions of support pieces 12a of the pivot frame 12 to be able to change directions together with the drive wheel assembly 300.

Each of the motors 33A and 33B contains a motor drive circuit 53 and a rotary encoder 52 for detecting the number of rotations of the associated motor as shown in FIG. 9.

FIG. 13 shows main frames 20 of the carriage V in the form of hollow base frames. Each main frame 20 includes engaging portions F in outer wall faces for engaging various devices such as an article handling device (not shown), the drive wheel assembly 300, the follower wheels 4, the optical communication unit 57 and the like.

The first frame 21 supporting the drive wheel assembly 300 is attached to the engaging portions F.

The present invention may be modified as follows:

1) The carriage according to the foregoing embodiment includes only one drive wheel assembly 300, but may include a plurality of drive wheel assemblies.

2) In the foregoing embodiment, the pair of wheels 31A and 31B is directed inwardly with respect to a direction of the running carriage V. Besides, the wheels 31A and 31B may be provided such that upper portions thereof are directed outwardly. This construction is known as a camber structure which further facilitates steering of the wheels.

Further, the wheels 31A and 31B may be mounted parallel to each other, i.e. such that the axis of rotation S may be perpendicular to the horizontal axis R in plan view.

3) In the foregoing embodiment, the looped guide track L is laid as a predetermined running line, along which the carriages V move. However, the guide track L is dispensable and the carriages V may effect a self-controlled run based on built-in map information contained in the carriages V. In this case, the running of the carriages V may be controlled in the same manner as in the foregoing embodiment.

4) In the foregoing embodiment, the axis of rotation S of the wheels 31A and 31B is positioned at the same level as the horizontal axis R for vertically oscillating the wheel support frames 42A and 42B. However, these axes may not necessarily be positioned at the same level. The axis of rotation S may be located either at a higher level or at a lower level than the horizontal axis R.

5) In the foregoing embodiment, the wheel support frames 42A and 42B for supporting the wheels 31A and 31B are supported by the pivot frame 12 to be vertically oscillatable about the horizontal axis R. Alternatively, the pair of wheels 31A and 31B may be supported by the pivot frame 12 to be vertically oscillatable independently. A support means may be provided for resiliently supporting the wheels 31A and 31B to permit the wheels 31A and 31B to move vertically independently with respect to the pivot frame 12.

Figure 19:
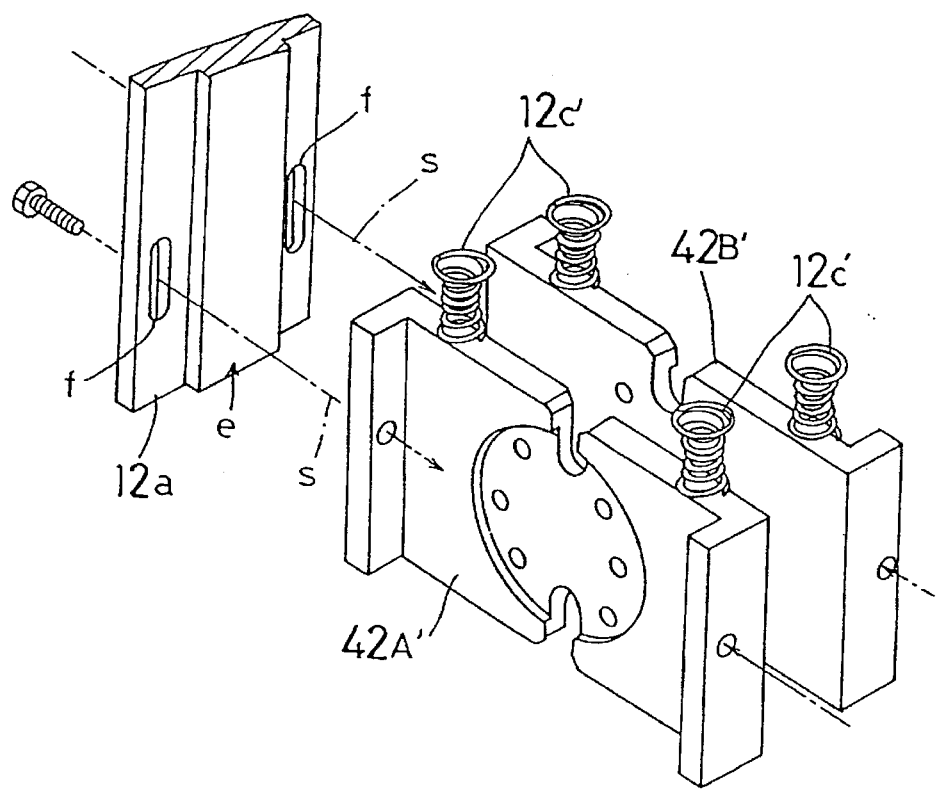
FIG. 19 is an exploded perspective view illustrating wheel support frames and a pivot frame according to a still further embodiment.
Figure 20:
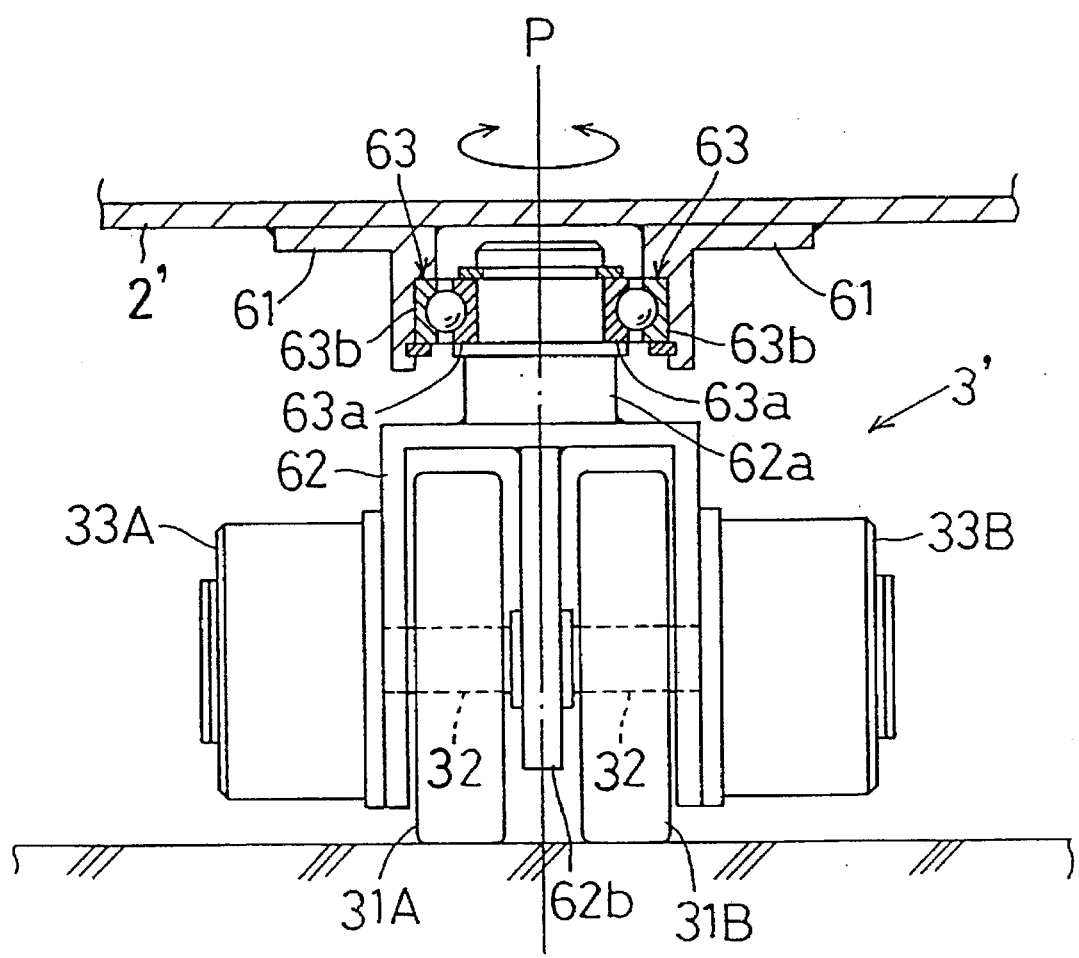
FIG. 20 is a front view of a wheel support apparatus for a carriage according to the prior art.

As seen from FIG. 19, for example, wheel support frames 42A' and 42B' may be supported to be vertically movable along side faces of a projection "e" defined on each support piece 12a of the pivot frame 12. Elastic elements 12c' such as coil springs instead of the stoppers 12c may be provided on the frames to act as support means for resiliently supporting the wheel support frames 42A' and 42B', respectively, by the pivot frame 12.

This mechanism is able to properly control steering of the carriage running on uneven surfaces, and restrain the carriage from rocking sideways when travelling the uneven surfaces. A reference symbol "f" denotes slots for vertically moving the wheel support frames 42A' and 42B' along the side face of the projection e.

In the foregoing embodiment, the wheel support frames 42A' and 42B' are vertically movable along the side face of the projection "e" defined on each of the support pieces 12a of the pivot frame 12. Alternatively, the wheel support frames 42A' and 42B' may be supported by the support pieces 12a of the pivot frame 12 to be pivotable about the horizontal axis S (with the elastic elements 12c' used in the same manner). More particularly, the projection "e" may be omitted, and round bores instead of the slots f may be defined to pivot the wheel support frames 42A' and 42B' about the horizontal axis S independently to vertically move the wheels 31A and 31B, respectively.

What is claimed is:

1. A carriage comprising:

an article support section for receiving articles thereon;

body frame means for supporting said article support section;

drive wheel means mounted on said body frame means and including a pair of wheels and a pair of motors for driving said wheels, respectively, each said motor coupled to one said wheel and positioned adjacent said wheel outside of a plane defined by said wheel, and each said motor having a diameter smaller than a diameter of said wheel; and wheel support frame means for supporting each of said wheels and said motors at a position on said motor generally opposite from where said wheel is positioned relative to said motor, said wheel support frame means being attached to said body frame means through a bearing to be pivotable about a vertical axis defined in a middle position between said wheels;

wherein said bearing has a dimension such that part of said wheels enters a space surrounded by an inner race thereof, wherein said bearing overlaps with at least part of said motors such that a cylinder defined by said bearing and parallel to said vertical axis encircles at least a part of said motors, and wherein said wheel support frame means supports said wheels with part of said wheels entering said space.

2. A carriage as claimed in claim 1, wherein said wheels are spaced apart from each other in a direction of an axis of rotation, said motors being operable to drive said wheels, respectively.

3. A carriage as claimed in claim 2, wherein said wheel support frame means is fixed to said inner race of said bearing for supporting said wheels with upper portions of said wheels entering said space.

4. A carriage as claimed in claim 2, wherein said bearing is attached to said body frame means through a first frame fixed to an outer race of the bearing.

5. A carriage as claimed in claim 2, further comprising a magnetic sensor coupled to said body frame means for detecting a guide track acting as a traveling line;

means for detecting a running distance coupled to said motors;

means for controlling a run of said carriage coupled to said body frame means;

a communication unit coupled to said body frame means for conducting radio communication with ground control means for instructing said carriage to run;

an optical communication unit coupled to said body frame means for communicating with stations on presence of the articles when handling the articles at the stations; and means for detecting stop marks coupled to said body frame means provided on the ground.

6. A wheel support apparatus as claimed in claim 2, wherein said wheel support frame means supports said pair of wheels to be directed inwardly of a running direction of said carriage such that a forward most portion of said pair of wheels in said running direction is closer to each other than a rearward most portion of said pair of wheels in said running direction.

7. A carriage according to claim 1, wherein said wheel support frame means supports said motors at positions radially outward of said inner race in plan view.

8. A carriage according to claim 1, wherein said wheel support frame means is attached to one end of each said motor at a position radially outward of said inner race and radially outward of an opposite end of said motor which is coupled to said wheel.

9. An article transport system comprising:

at least one carriage;

stations for handling articles; and ground control means for instructing each said carriage to run between said stations;

each said carriage including an article support section for receiving the articles thereon, body frame means for supporting said article supporting section, and a drive wheel assembly mounted on said body frame means and having a pair of wheels and a pair of motors for driving said wheels, respectively, each said motor coupled to one said wheel and positioned adjacent said wheel outside of a plane defined by said wheel, and each said motor having a diameter smaller than a diameter of said wheel, and wheel support frame means for supporting each of said wheels and said motors at a position on said motor generally opposite from where said wheel is positioned relative to said motor, said wheel support frame means being attached to said body frame means through a bearing to be pivotable about a vertical axis defined in a middle position between said wheels;

wherein said bearing has a dimension such that part of said wheels enters a space surrounded by an inner race thereof, wherein said bearing overlaps at least a part of said motors such that a cylinder defined by said bearing and parallel to said vertical axis encircles at least part of said motors; and wherein said wheel support frame means supports said wheels with part of said wheels entering said space.

10. An article transport system as claimed in claim 9, wherein said wheels are spaced from each other in a direction of an axis of rotation, said motors being operable to drive said wheels, respectively.

11. An article transport system as claimed in claim 10, wherein an article delivering demand signal is transmitted from said stations to said ground control means and a running instruction signal is transmitted from said control means to said carriage, wherein said signals are transmitted through communication units mounted on said stations, said control means and said carriage, respectively.

12. An article transport system as claimed in claim 10, wherein said wheel support frame means supports said pair of wheels to be directed inwardly of a running direction of said carriage such that a forward most portion of said pair of wheels in said running direction is closer to each other than a rearward most portion of said pair of wheels in said running direction.

* * * * *